(12) United States Patent
Houghton

(10) Patent No.: US 7,571,646 B1
(45) Date of Patent: Aug. 11, 2009

(54) ELECTRONIC LIQUID LEVEL SENSOR

(76) Inventor: Brian L. Houghton, 3608 W. Chenango Ave., Littleton, CO (US) 80123

( * ) Notice: Subject to any disclaimer, the term of this patent is extended or adjusted under 35 U.S.C. 154(b) by 367 days.

(21) Appl. No.: 11/373,055

(22) Filed: Mar. 10, 2006

Related U.S. Application Data

(60) Provisional application No. 60/660,096, filed on Mar. 10, 2005, provisional application No. 60/780,531, filed on Mar. 9, 2006.

(51) Int. Cl.
*G01F 23/00* (2006.01)
(52) U.S. Cl. .................................. 73/304 C; 73/304 R
(58) Field of Classification Search ............... 73/340 R, 73/304 R, 313; 340/620; 361/284
See application file for complete search history.

(56) References Cited

U.S. PATENT DOCUMENTS

| | | | |
|---|---|---|---|
| 1,778,508 A * | 10/1930 | Peoples | 324/414 |
| 2,145,966 A * | 2/1939 | Bedell | 242/272 |
| 3,921,450 A * | 11/1975 | Pfister | 73/295 |
| 4,122,718 A * | 10/1978 | Gustafson | 73/304 C |
| 4,354,180 A | 10/1982 | Harding | |
| 4,449,384 A | 5/1984 | Jones | |
| 4,459,584 A | 7/1984 | Clarkson | |
| 4,805,454 A * | 2/1989 | LeVert | 73/295 |
| 4,814,752 A | 3/1989 | Lehman | |
| 4,949,069 A | 8/1990 | Wilson | |
| 4,982,606 A | 1/1991 | Adamski et al. | |
| 5,026,954 A | 6/1991 | Cebulski | |
| 5,028,910 A | 7/1991 | Meacham et al. | |
| 5,210,769 A | 5/1993 | Seidel et al. | |
| 5,493,877 A | 2/1996 | Wickremasinghe | |
| 5,565,687 A | 10/1996 | Berrill | |
| 5,602,540 A | 2/1997 | Spillman, Jr. | |
| 5,613,399 A | 3/1997 | Hannan et al. | |
| 5,743,135 A | 4/1998 | Sayka et al. | |
| 5,773,913 A | 6/1998 | Casselden | |
| 6,028,521 A | 2/2000 | Issachar | |
| 6,218,949 B1 | 4/2001 | Issachar | |
| 6,624,755 B1 | 9/2003 | Chamberlin | |
| 6,972,685 B2 | 12/2005 | Sato et al. | |

* cited by examiner

*Primary Examiner*—Hezron Williams
*Assistant Examiner*—Tamiko D Bellamy
(74) *Attorney, Agent, or Firm*—Rick Martin; Patent Law Offices of Rick Martin, P.C.

(57) ABSTRACT

A pair of wires are coated in a conductive plastic sheath, and then imbedded in the inside of a plastic tube. The tube can be dropped down an oil well casing below the fluid level. A DC power source is applied across the wires, and current flows across the inside of the tube between the wires. The resistance drops between the wires in proportion to the fluid level inside the tube. Ohm's law allows a calculation of fluid level along the tube.

9 Claims, 3 Drawing Sheets

ELECTRONIC LIQUID LEVEL SENSOR

CROSS REFERENCE APPLICATIONS

This application is a non-provisional application claiming the benefits of provisional application No. 60/660,096 filed Mar. 10, 2005 and provisional application No. 60/780,531 filed Mar. 9, 2006.

FIELD OF INVENTION

The present invention relates to using the resistance between two semi-insulated wires immersed in a liquid to determine the depth of the liquid.

BACKGROUND OF THE INVENTION

It is known to use an electronic circuit to determine the depth of a liquid. Below follows a brief summary of the prior art.

U.S. Pat. No. 4,122,718 (1978) to Gustafason discloses an AC circuit that measures capacities along a tube (FIG. 7 and claim 13-16) filled with a liquid in a tank.

U.S. Pat. No. 4,354,180 (1982) to Harding discloses a light beam based low level detector.

U.S. Pat. No. 4,449,384 (1984) to Jones discloses an appliance controller.

U.S. Pat. No. 4,459,584 (1984) to Clarkson discloses a magnetic sensor.

U.S. Pat. No. 4,814,752 (1989) to Lehman discloses a float switch.

U.S. Pat. No. 4,949,069 (1990) to Wilson discloses liquid sensing probe connected to a time delay low level alarm.

U.S. Pat. No. 4,982,606 (1991) to Adamski et al. discloses a capacitance based level detector using plates immersed in the tank.

U.S. Pat. No. 5,026,954 (1991) to Cebulski discloses a float switch.

U.S. Pat. No. 5,028,910 (1991) to Meacham et al. discloses a float switch.

U.S. Pat. No. 5,210,769 (1993) to Seidel et al. discloses a level sensor using a DC based positive temperature coefficient conductor. See col. 4 lines 5-38 for details of the "Balco" wire which changes resistance based on its surrounding fluid level. See also col. 9 lines 40 et seq.

U.S. Pat. No. 5,493,877 (1996) to Wickremasinghe discloses a fluid presence sensor using a plastic covered foil.

U.S. Pat. No. 5,565,687 (1996) to Berrill discloses Hall effect switches to detect a floating magnet.

U.S. Pat. No. 5,602,540 (1997) to Spillman Jr. discloses an AC oscillator circuit to detect liquid level. Gustafson should have been cited by the Examiner.

U.S. Pat. No. 5,613,399 (1997) to Hannan et al. discloses a plurality of capacitance plates stacked inside a container with a controller to calculate depth of immersion.

U.S. Pat. No. 5,743,135 (1998) to Sayka et al. discloses an optical float switch.

U.S. Pat. No. 5,773,913 (1998) to Casselden discloses a piezoelectric sensor.

U.S. Pat. No. 6,028,521 (2000) and U.S. Pat. No. 6,218,949 to Issachar discloses a magnet float switch and a waveguide level detector.

U.S. Pat. No. 6,624,755 (2003) to Chamberlin discloses a resistive probe and a ring to prevent a false reading.

U.S. Pat. No. 6,972,685 (2005) Sato et al. discloses a float switch.

None of the above noted inventions have made commercial inroads into measuring the depth of the liquid in an oil/gas well. The present invention has been successfully tested in an oil/gas well application.

SUMMARY OF THE INVENTION

The primary aspect of the present invention is to provide a resistance based circuit device to sense the depth of a liquid.

Another aspect of the present invention is to provide a conventional air pressure measurement capability with a tube which supports the electrical sensor leads.

Other aspects of this invention will appear from the following description and appended claims, reference being made to the accompanying drawings forming a part of this specification wherein like reference characters designate corresponding parts in the several views.

A plastic tube of perhaps about one third inch in outside diameter has a central opening of perhaps about one ninth inch diameter. On the inside of the opening walls are imbedded an opposing pair of conductive wires. The inside tube wall adjacent each wire is conductive, wherein the rest of the tube is an insulator.

A switched DC voltage (switched at about 1000 Hz) is applied across the pair of wires to prevent free ions from drifting to one side. Voltage across the wires is measured, wherein with a constant current power source, the voltage is a straight line function of the resistance between the pair of wires. The higher the liquid level, the lower the resistance and the lower the voltage via Ohm's law of Voltage=(Current)(Resistance).

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
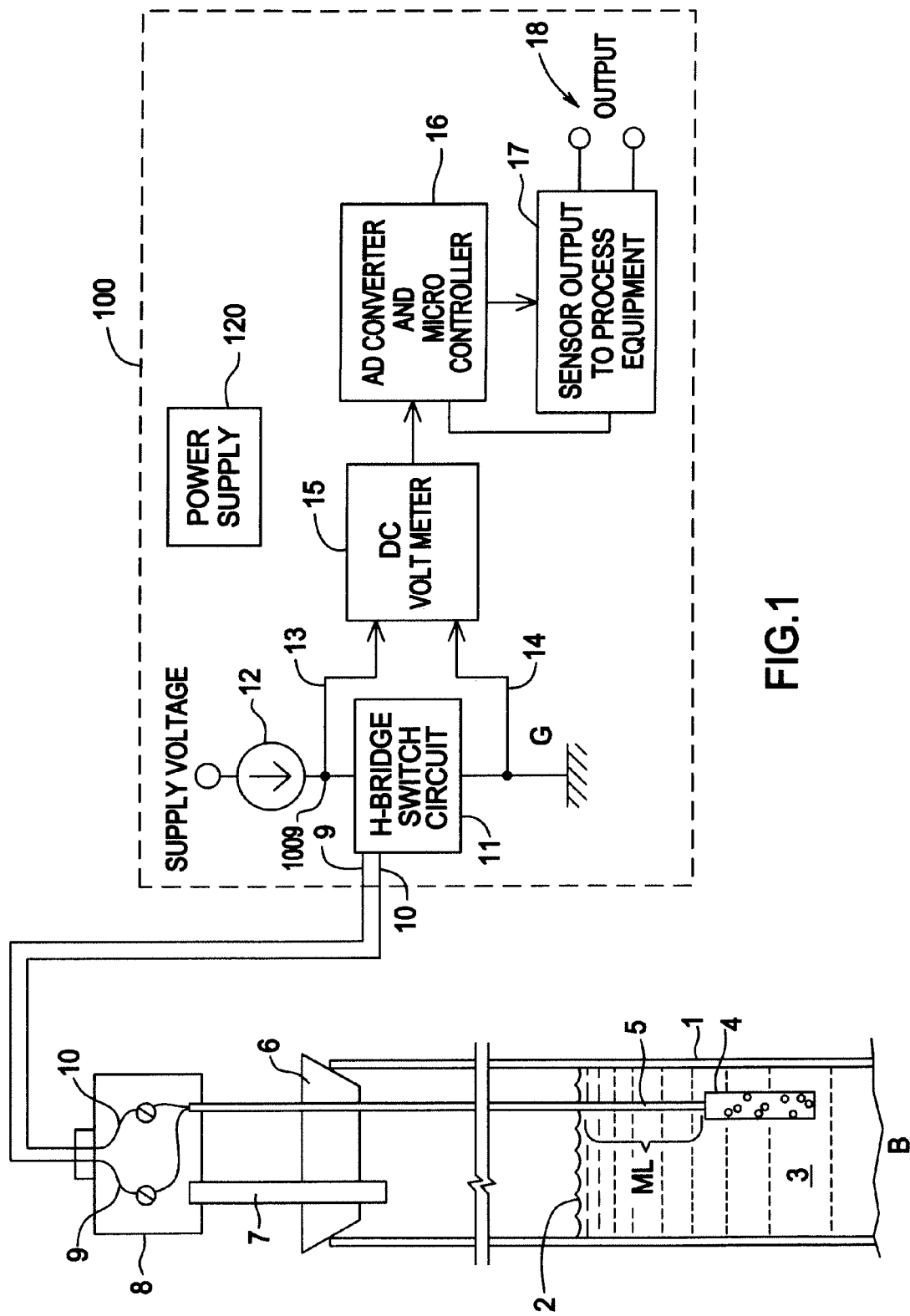
FIG. 1 is a schematic of a complete electronic fluid measuring system.

Referring first to FIG. 1 a well casing 1 contains a fluid 3 that has a fluid level 2 which requires measuring for its height above the bottom B. A sensor tube 5 has a distal end 4 which is a gas separator to prevent gas bubbles from moving up into the sensor tube 5.

The well head 6 has a vent tube 7. Sensor tube wires 9, 10 extend through a connection block 8.

The measuring module 100 can be incorporated into a single, plug into AC, portable box.

A 24 volt DC power supply 120 sends DC supply voltage 12 to an H-Bridge switching circuit 11 which reverses the DC signal at about 1000 Hz. A DC voltmeter 15 senses leads 13, 14 and ground G to determine what the resistance is between wires 9, 10 with the effect of the fluid level 2 working along the length ML of the tube 5 which is under the fluid. Note that measuring point 1009 is above the switching circuit 11 so it only picks up a steady DC signal, not a switched signal. Using Ohm's law the voltage at DC voltmeter 15 equals a known current times the resistance of tube segment ML. The resistance of the tube 5 segment above the fluid level 2 is infinite because the air between the wires 9, 10 acts as an insulator. The higher the fluid level 2 the less resistance between the wires 9, 10 thus the lower the voltage at DC voltmeter 15. An analog to digital converter 16 sends a digital signal to a sensor output circuit which has jacks 18.

A prior art (not shown) air bubbler measurement system can also be used to sense fluid level with the tube 5 being hollow.

Figure 2:
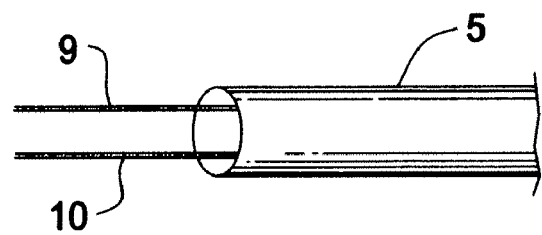
FIG. 2 is a side plan view of a sensor probe.
Figure 3:
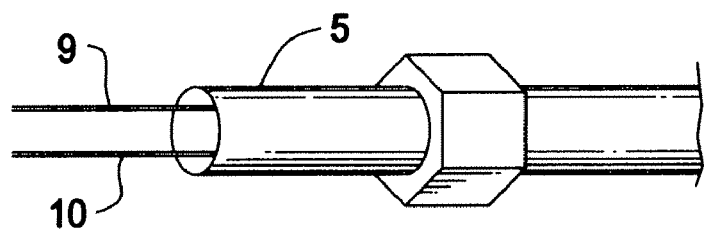
FIG. 3 is a side plan view of the sensor probe of FIG. 2 with a compression fitting nut.

FIGS. 2, 3 shown a short tube 5 which might be used in a tank.

A compression fitting nut is used to secure the tube to a top of a tank.

Figure 4:
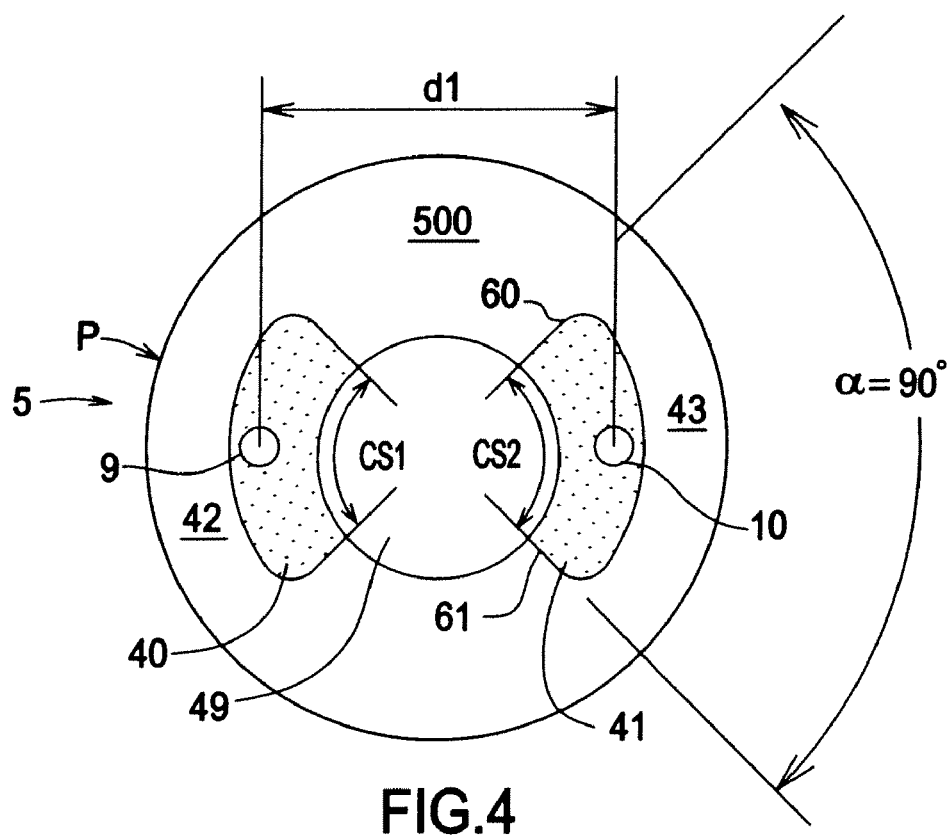
FIG. 4 is a cross sectional view of the probe shown in FIG. 1.

FIG. 4 shows the cross section of the tube 5. Tube 5 has an outer perimeter P and a hollow core 49. The tubing 500 is an insulator made preferably of plastic. Nominally $d_1$=0.235 inch, angle=90°, and angle defines the approximate outer boundaries 60, 61 of the conductive plastic segments 40, 41 which are imbedded around the hollow core 49 of the tube 5 in tubing 500 halves 42, 43 respectively.

Figure 5:
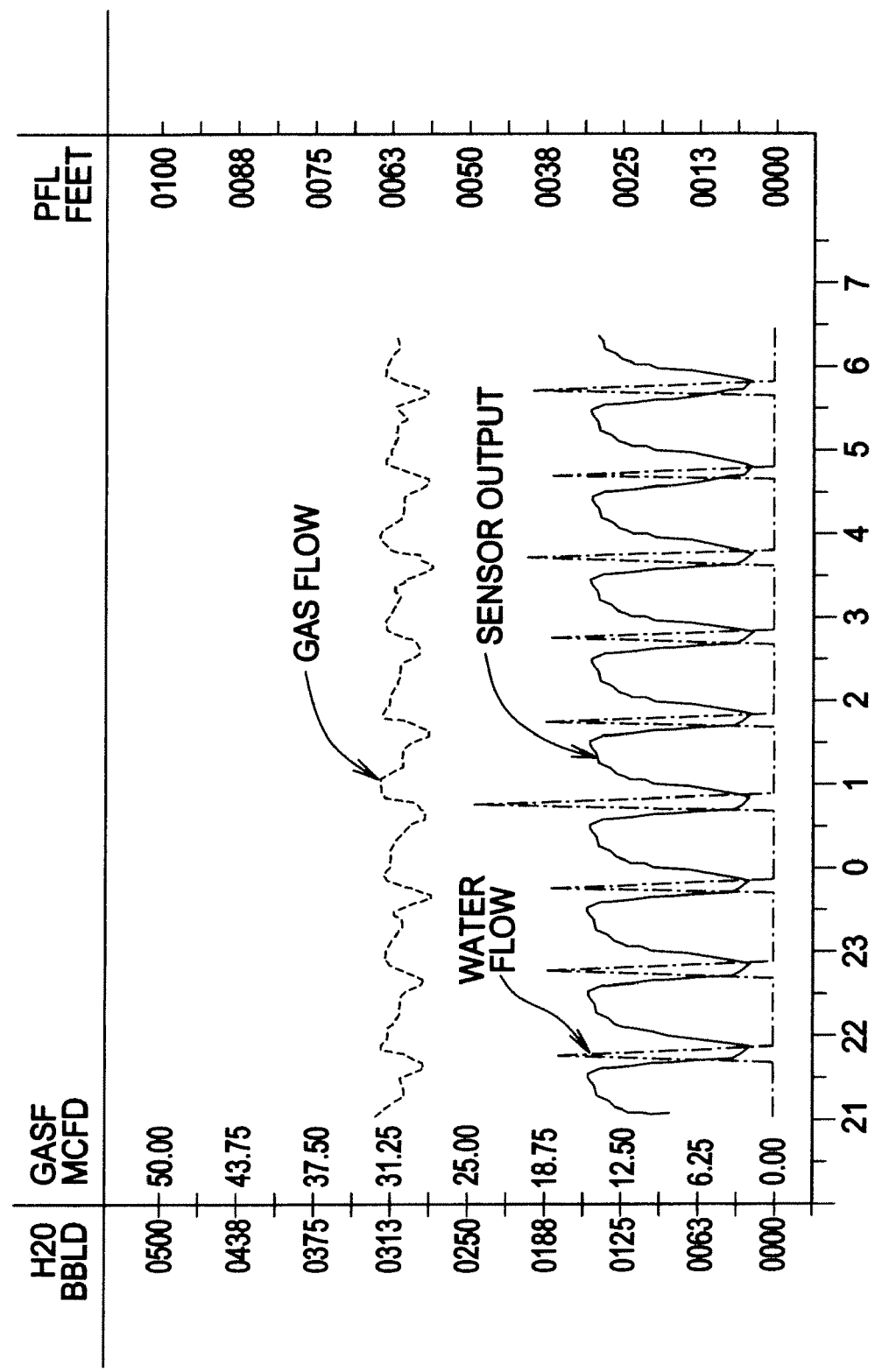
FIG. 5 is a graph of a test experiment in an oil/gas well.

In FIG. 5 an oil/gas well was fitted with a tube 5, and the "sensor output" graph shows a repeatable signal of fluid level over time which is represented by the X axis from 21 to 7.

Abbreviations are:

"GASF"=GAS FLOW

"MCFD"=THOUSAND CUBIC FEET PER DAY

"BBLD"=BARRELS PER DAY OF WATER PUMPED

"PFL"=Pressure of the fluid as measured by a conventional gas bubble method using tube 5 of FIG. 1.

The "sensor output" signal is used to trigger a water pump to keep the fluid level in a range for well operation. When the pump activates, the level goes down.

Below follows the specification of the prototype tube 5.

TUBE BODY MATERIAL 500

EXTRUSION GRADE LDPE NO RE-GRIND COLOR—NATURAL PLASTIC WEIGHT/FOOT—0.02882 lb/ft.

CONDUCTIVE MATERIAL 40, 41

CARBON FILLED LDPE TENSILE STRENGTH—900 PSI ELONGATION—10+% FLEXURAL STRENGTH—700 PSI VOLUME RESISTIVITY-max. 100 ohm-cm SURFACE RESISTIVITY-max 1E3 ohms/sq PLASTIC WEIGHT/FOOT-0.008185 lb/ft MANU-PREMIX THERMO PLASTICS MANU# CP1314 or Equiv.

TUBING PROPERTIES:

OPERATING PRESSURE—350 PSI BURST PRESSURE—600 PSI RESISTIVITY—max 1.5 Ohms/foot WEIGHT—0.037 lb/foot OPERATING TEMP—40 to 85 C. BEND RADIUS—min 10 in.

STAINLESS WIRES 9 AND 10

WIRE DIAMETER—0.0201 in. WIRE TYPE—304 SS SOFT ANNEALED

OVERALL TUBE 5

PROPERIES ID 0.160 in. OD 0.375 in. WALL THK 0.197 in

TOLERANCE;

+/−0.005 +/−2 degrees

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A fluid level sensor comprising:
a tube constructed of a pliable, non-conductive material;
said tube having a hollow core with an inside wall;

a first and a second conductive wire each having a sheath of conductive material;

said sheaths forming a space between the tube and themselves, wherein the space is filled with an insulator;

said first and second conductive wires mounted opposite each other on opposing sides of the inside wall; and wherein a fluid in the hollow core provides a current path between the first and second wires, via the sheaths of conductive material the first and the second wires thereby enabling a voltmeter measuring module connected across the first and second wires to calculate a height of the fluid in the hollow core;

wherein the voltmeter measuring module further comprises a processor which uses the formula (voltage across the first and second conductive wires)=(current) (resistance across the hollow portion of the tube having no fluid therein), and wherein the voltage is calibrated to yield the height of the fluid in the tube.

2. The sensor of claim 1, wherein the voltmeter measures an unswitched DC voltage between the first and second wires.

3. The sensor of claim 1, further comprising a bridge switch circuit to reverse the DC voltage, thereby preventing free ions from drifting to either the first or the second wire.

4. The sensor of claim 1, wherein each of the first and second wires has a distal end connected to a gas separator, thereby preventing gas bubbles from moving up the hollow core.

5. The sensor of claim 1, wherein the hollow core has a circular cross section, and each sheath of conductive material covers about one fourth a circumference of the circular cross section.

6. An electronic fluid level sensor comprising:

a first and a second conductive wire each having a sheath of a conductive material;

a hollow tube suited to receive a column of a fluid in a hollow core in the hollow tube;

an insulator surrounding the first and second conductive wires and their sheaths between the hollow tube and its hollow core;

said first and second wires mounted in the hollow tube and parallel thereto;

wherein a section of the sheath of conductive material of the first conductive wire is exposed in the hollow core;

wherein a section of the sheath of conductive material of the second conductive wire is exposed in the hollow core so as to not touch the first conductive wire sheath; and wherein a level of the column of fluid provides a current path between the first and second conductive wires;

wherein a voltmeter connected across the first and second conductive wires indicates a voltage which is proportional to the level of the column of fluid.

7. The sensor of claim 6, wherein the hollow of the hollow tube has a cross section that is circular, wherein the sections of the sheaths of conductive material conform to the circular shape of the hollow.

8. The sensor of claim 7, wherein the sections of the sheaths are mounted opposite one another in the hollow.

9. The sensor of claim 6, further comprising a gas separator connecting the first and second conductive wires at their distal ends.

* * * * *